US009336574B2

(12) United States Patent
Zhang et al.

(10) Patent No.: US 9,336,574 B2
(45) Date of Patent: May 10, 2016

(54) IMAGE SUPER-RESOLUTION FOR DYNAMIC REARVIEW MIRROR

(71) Applicant: GM GLOBAL TECHNOLOGY OPERATIONS LLC, Detroit, MI (US)

(72) Inventors: Wende Zhang, Troy, MI (US); Jinsong Wang, Troy, MI (US); Kent S. Lybecker, Rochester, MI (US); Jeffrey S. Piasecki, Rochester, MI (US); Ryan M. Frakes, Bloomfield Hills, MI (US); Travis S. Hester, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 144 days.

(21) Appl. No.: 14/041,058

(22) Filed: Sep. 30, 2013

(65) Prior Publication Data
US 2014/0193032 A1 Jul. 10, 2014

Related U.S. Application Data

(60) Provisional application No. 61/749,778, filed on Jan. 7, 2013.

(51) Int. Cl.
*G06K 9/32* (2006.01)
*G06T 5/00* (2006.01)
*G06T 3/00* (2006.01)

(52) U.S. Cl.
CPC ............ *G06T 5/003* (2013.01); *G06T 3/0012* (2013.01); *G06T 2207/10016* (2013.01); *G06T 2207/20012* (2013.01); *G06T 2207/30252* (2013.01)

(58) Field of Classification Search
None
See application file for complete search history.

(56) References Cited

U.S. PATENT DOCUMENTS

| 8,106,959 | B2* | 1/2012 | Hara | 348/222.1 |
| 8,290,212 | B2* | 10/2012 | Wheeler | G06K 9/0063 |
| | | | | 348/148 |
| 8,654,202 | B2* | 2/2014 | Broekaert et al. | 348/208.4 |
| 2003/0095716 | A1* | 5/2003 | Gindele et al. | 382/260 |
| 2005/0146607 | A1* | 7/2005 | Linn et al. | 348/148 |
| 2007/0268374 | A1* | 11/2007 | Robinson | H04N 3/1587 |
| | | | | 348/222.1 |
| 2008/0042812 | A1* | 2/2008 | Dunsmoir et al. | 340/435 |
| 2010/0014709 | A1* | 1/2010 | Wheeler | G06K 9/0063 |
| | | | | 382/103 |
| 2010/0123792 | A1* | 5/2010 | Nagumo | H04N 5/145 |
| | | | | 348/222.1 |
| 2010/0272184 | A1* | 10/2010 | Fishbain et al. | 375/240.16 |
| 2011/0025860 | A1* | 2/2011 | Katougi et al. | 348/207.2 |
| 2011/0037894 | A1* | 2/2011 | Sbaiz | G06T 1/00 |
| | | | | 348/441 |
| 2011/0206296 | A1* | 8/2011 | Sakaguchi | G06T 3/4053 |
| | | | | 382/299 |
| 2013/0070126 | A1* | 3/2013 | Albu | 348/241 |

OTHER PUBLICATIONS

Paris et al., "Bilateral Filtering: Theory and Applications", 2008, Now Publishers Inc. Foundations and Trends in Computer Graphics and Vision, vol. 4, No. 1, 1-73.*
Park et al., Super-Resolution Image Reconstruction: A Technical Overview, IEEE Signal Processing Magazine, May 2003, p. 21-36, 1054-5888.
Farsui et al., Fast and Robust Multiframe Super Resolution, IEEE Transactions on Image Processing, Oct. 2004, vol. 13, No. 10, p. 1327-1344.
Tomasi et al., Bilateral Filtering for Gray and Color IMages, Proceedings of the 1998 IEEE International Conferance on Computer Vision, Bombay, India.
U.S. Appl. No. 13/835,741, filed Mar. 15, 2013.
U.S. Appl. No. 13/962,156, filed Mar. 8, 2013.

* cited by examiner

*Primary Examiner* — Jason Heidemann

(57) ABSTRACT

Method for applying super-resolution to images captured by a camera device of a vehicle includes receiving a plurality of image frames captured by the camera device. For each image frame, a region of interest is identified within the image frame requiring resolution related to detail per pixel to be increased. Spatially-implemented super-resolution is applied to the region of interest within each image to enhance image sharpness within the region of interest.

17 Claims, 5 Drawing Sheets

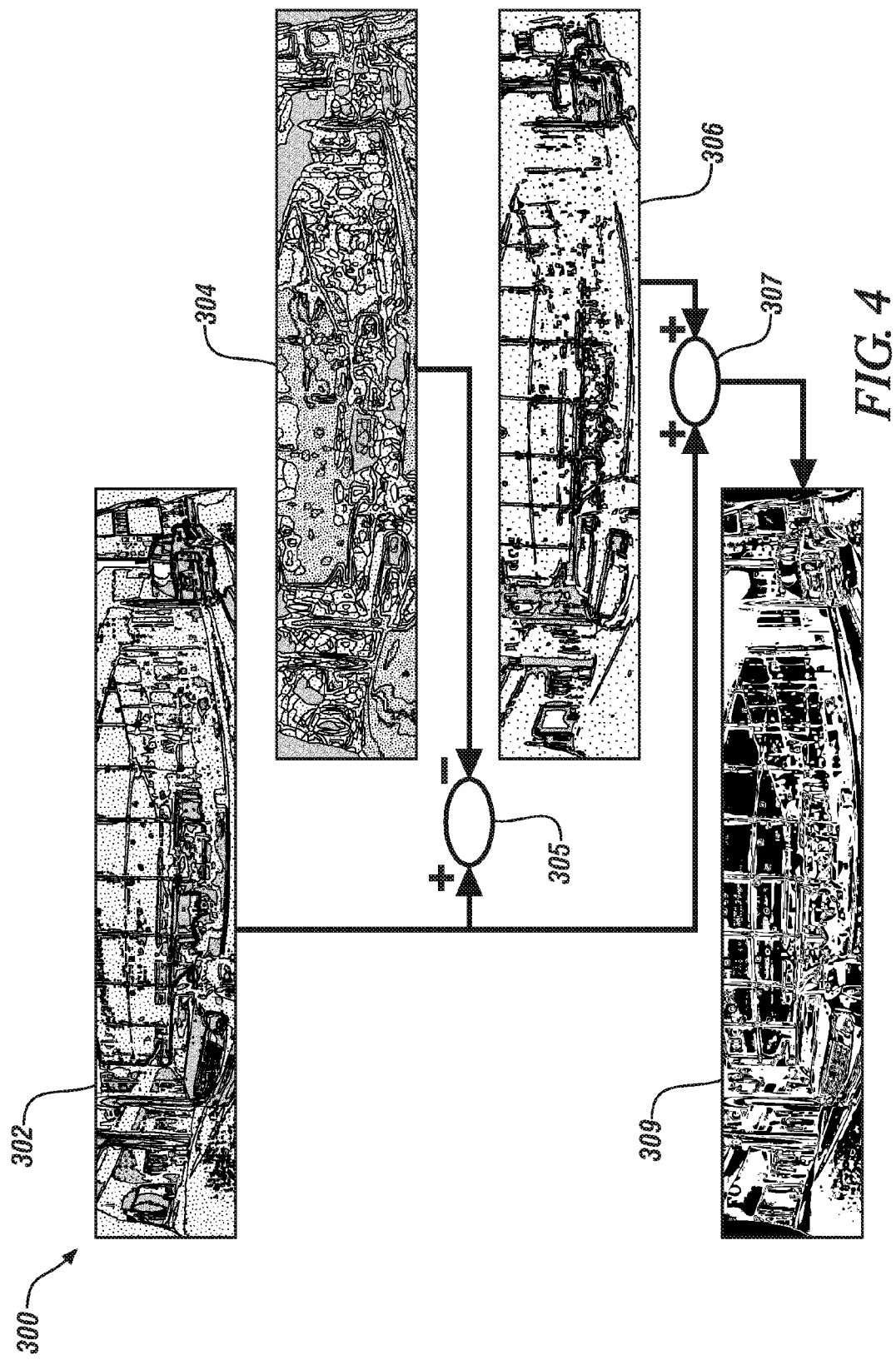

IMAGE SUPER-RESOLUTION FOR DYNAMIC REARVIEW MIRROR

CROSS REFERENCE TO RELATED APPLICATIONS

This application claims the benefit of U.S. Provisional Application No. 61/749,778 filed on Jan. 7, 2013, which is incorporated herein by reference.

TECHNICAL FIELD

This disclosure is related to improving resolution related to pixel detail of images.

BACKGROUND

The statements in this section merely provide background information related to the present disclosure. Accordingly, such statements are not intended to constitute an admission of prior art.

Vehicle systems may use in-vehicle vision systems for rear-view scene viewing or detection, side-view scene viewing or detection, and forward-view scene viewing or detection. In one example, a raw image obtained from a rear-view camera device of a subject vehicle may require a center region of the raw image to be enlarged for display on a rear view mirror device, e.g., dynamic rearview mirror, within a vehicle. In this example, the enlarged center region is created by stretching the raw image, thereby resulting in reduced resolution on a per pixel basis in the center region.

Super resolution (SR) is a class of techniques for enhancing the resolution related to per pixel detail of an image obtained by an imaging system including a camera device. Multi-frame SR methods, are temporally-implemented, and may use sub-pixel shifts between multiple low resolution images of the same scene to create an improved resolution related to per pixel detail of the image by fusing information from all the low resolution images. Single-frame SR methods, are spatially-implemented, and attempt to magnify a raw image without introducing blur.

It is known to apply multi-exposure image noise reduction when a raw image is degraded by noise. Noise can be reduced by averaging multiple exposures to acquire the most suitable combination to reduce noise. It is further known to apply single-frame de-blurring to mitigate blurring in an image in certain situations, such as when optical defocus and optical aberrations are present. Single-frame de-blurring applies spatial-frequency filtering within a diffraction-mandated pass band.

SUMMARY

Method for applying super-resolution to images captured by a camera device of a vehicle includes receiving a plurality of image frames captured by the camera device. For each image frame, a region of interest is identified within the image frame requiring resolution related to detail per pixel to be increased. Spatially-implemented super-resolution is applied to the region of interest within each image to enhance image sharpness within the region of interest.

BRIEF DESCRIPTION OF THE DRAWINGS

One or more embodiments will now be described, by way of example, with reference to the accompanying drawings, in which:

FIGS. 2-1 and 2-2 illustrate an image captured by a rear-view camera device of FIG. 1 representing a field of view rearward of the vehicle, in accordance with the present disclosure;

FIG. 4 illustrates an exemplary sharpening filter to enhance sharpness of an identified region of interest within an image frame, in accordance with the present disclosure;

DETAILED DESCRIPTION

Figure 1:
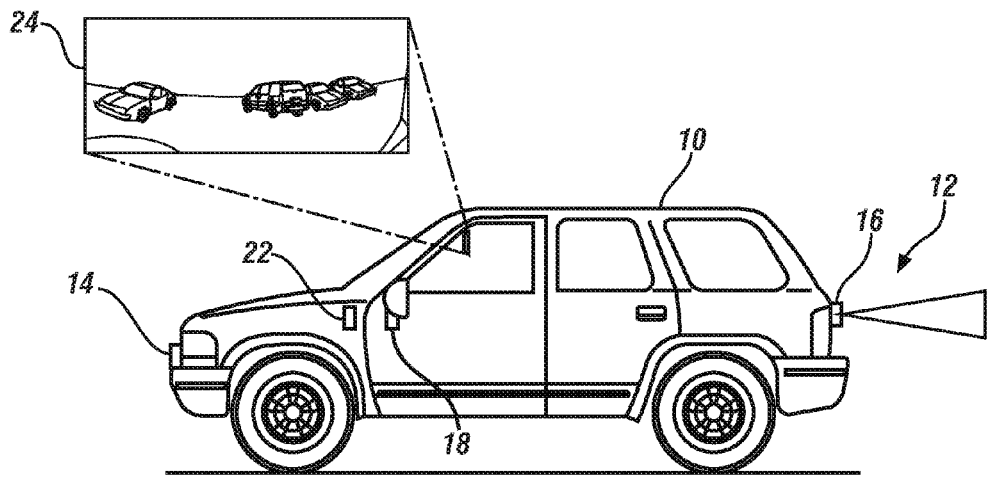
FIG. 1 illustrates a subject vehicle including a surround view vision-based imaging system, in accordance with the present disclosure.

Referring now to the drawings, wherein the showings are for the purpose of illustrating certain exemplary embodiments only and not for the purpose of limiting the same, FIG. 1 illustrates a subject vehicle (vehicle) 10 including a surround view vision-based imaging system 12, in accordance with the present disclosure. The vehicle is traveling along a road and the vision-based imaging system 12 captures images of the road. The vision-based imaging system 12 captures images surrounding the vehicle based on the location of one or more vision-based camera devices. In the embodiments described herein, the vision-based imaging system will be described as capturing images rearward of the vehicle; however, it should also be understood that the vision-based imaging system 12 can be extended to capturing images forward of the vehicle and to the sides of the vehicle.

The vision-based imaging system 12 can include any combination of a front-view camera device 14 for capturing a field of view (FOV) forward of the vehicle 10, a rear-view camera device 16 for capturing a FOV rearward of the vehicle 10, a left-side view camera device 18 for capturing a FOV to a left side of the vehicle 10, and a right-side view camera for capturing a FOV on a right side of the vehicle 10. The cameras 14-18 can be any camera suitable for the embodiments described herein, many of which are known in the automotive art, that are capable of receiving light, or other radiation, and converting the light energy to electrical signals in a pixel format using, for example, one of charged coupled device (CCD) sensors or complimentary metal-oxide-semiconductor (CMOS) sensors. The cameras 14-18 generate frames of image data at a certain data frame rate that can be stored for subsequent processing. The cameras 14-18 can be mounted within or on any suitable structure that is part of the vehicle, such as bumpers, spoilers, trunk lids, facie, grill, side-view mirrors, door panels, etc., as would be well understood and appreciated by those skilled in the art. Image data from the cameras 14-18 is sent to a non-transitory processing device 22 (e.g., processor) that processes the image data to generate images that can be displayed on a rearview mirror display device 24.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

Figures 1, 2:
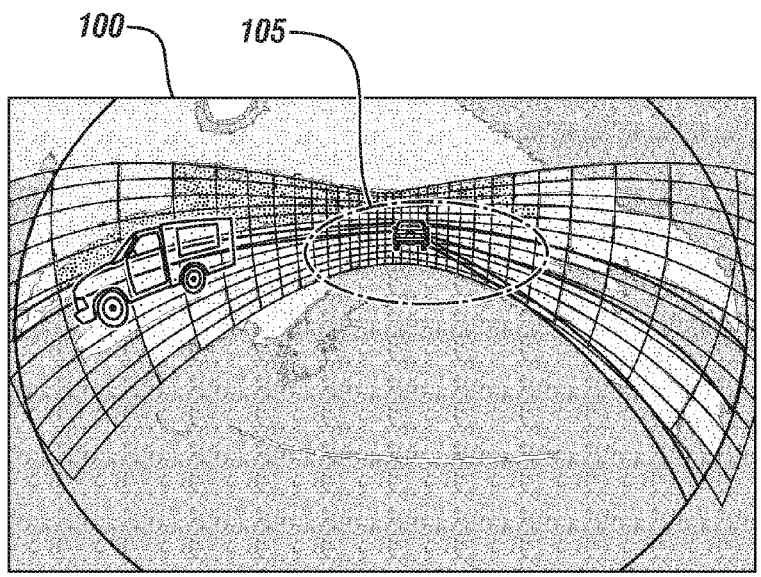
Figure 2:
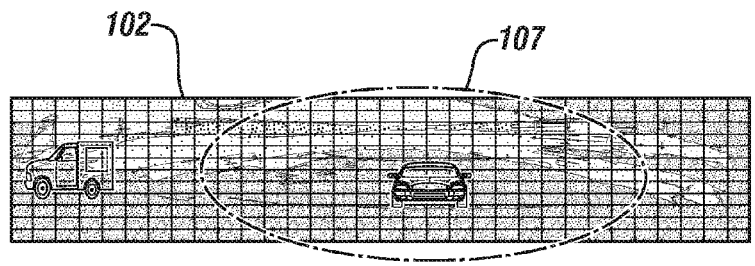

FIGS. 2-1 and 2-2 illustrate an image captured by the rear-view camera device 16 of FIG. 1 representing a field of view (FOV) rearward of the vehicle 10, in accordance with the present disclosure. The rear-view camera device 16 can be a fish-eye camera device known in the art. In a non-limiting exemplary embodiment, the rear-view camera device 16 is configured to capture a 180° FOV rearward of the vehicle with a downward pitch. Image data from the camera device 16 can be processed by the processor 22 of FIG. 1 to generate an image that can be displayed on any suitable vehicle display units including the rearview mirror display device 24 of FIG. 1. In one embodiment, the rearview mirror display device is integrated within a human machine interface (HMI) of the vehicle. In another embodiment, the rearview display device is integrated with a rearview mirror mounted within the interior of the vehicle. While the embodiments described herein refer to the rear-view camera device 16 configured to capture the FOV rearward of the vehicle, it will be understood that the embodiments herein can be similarly applied to camera devices capturing images representing a FOV forward of the vehicle or to the sides of the vehicle.

Referring to FIG. 2-1, a raw image 100 is captured by the camera device illustrating the FOV rearward of the vehicle. The raw image includes optical aberrations, such as spherical aberrations, resulting in a distorted center region encompassed by a region of interest 105. In one embodiment, spherical aberrations resulting in the distorted center region occur when the raw image is captured by a fish-eye camera device. It will be appreciated that the distorted center region is undesirable because objects rearward of the subject vehicle, such as following vehicles, are perceived as being smaller and further away than they actually are.

Referring to FIG. 2-2, processor 22 applies digital or image processing to the raw image 100 of FIG. 2-1 to generate a display image 102 including an enlarged center region encompassed by a region of interest 107. The enlarged center region encompassed by the region of interest 107 corresponds to the distorted center region encompassed by the region of interest 105 of FIG. 2-1. Specifically, the digital or image processing applied by the processor 22 stretches the raw image to enlarge the center region encompassed by the region of interest 107. As a result, the area within the region of interest 107 has a reduced image resolution. As used herein, the term "image resolution" refers to detail per pixel. This reduced image resolution within the region of interest 107 results from pixel density within the region of interest 107 being reduced when the distorted center region encompassed by the region of interest 105 is enlarged through stretching of the raw image 100. Simply put, detail per pixel within the region of interest 105 of FIG. 2-1 is equally distributed, whereas the detail per pixel within the region of interest 107 of FIG. 2-2 is reduced because a greater number of pixels are used to describe the same details after the raw image 100 is stretched.

Exemplary embodiments herein are directed toward applying super-resolution to an identified region of interest within one or more image frames for enhancing the resolution in the center region. While this disclosure refers to the region of interest being a "center region" within an image frame, it is appreciated that embodiments of this disclosure can include the region of interest including the entire image frame. As used herein, the term "super-resolution" refers to a signal processing approach executed by the non-transitory processing device 22 (e.g., processor) of FIG. 1 that is location-dependent to enhance the resolution of the identified region of interest indicative of having diminished resolution related to detail per pixel. As used herein, the term "enhancing the resolution" can refer to reducing noise, enhancing image sharpness, or reducing blur within the identified region of interest. In an exemplary embodiment, the identified region of interest corresponds to the enlarged center region encompassed by the region of interest 107 of the display image 102 of FIG. 2-2. Thus, super-resolution is applied after a raw image has been stretched to enlarge the center region. In an alternative embodiment, the identified region of interest may also correspond to the distorted center region encompassed by the region of interest 105 of the raw image 100 of FIG. 2-1 since the region of interest 105 will become enlarged through the aforementioned stretching of the raw image 100, and thus, require resolution related to detail per pixel to be increased. It will be appreciated that the regions of interest 105 and 107 can be predetermined ahead of time to reduce processing power when parameters of the camera device (e.g., rearward-camera device 16) are known. The location-dependent super resolution applied to the identified region of interest can include spatially-implemented super-resolution for a single image frame or temporally-implemented super resolution for multiple image frames. Moreover, when a plurality of image frames are obtained, the spatially-implemented super-resolution is applied to the identified region of interest in each image frame on an individual basis.

One example of spatially-implemented super-resolution includes application of a de-noising filter. As used herein, the term "de-noising filter" refers to a filter to reduce noise within the identified region of interest. A non-limiting exemplary de-noising filter includes a bilateral filter that reduces noise within the identified region of interest through smoothing identified image planes while preserving identified edges within the identified region of interest. Edges and planes within the identified region of interest can be identified based on monitoring image gradient of the image frame. One or more edges can be identified where the monitored image gradient is at least a gradient edge threshold. Similarly, one or more planes can be identified within the identified region of interest where the monitored image gradient is less than the gradient edge threshold. Described in greater detail below, the application of the de-noising filter replaces a pixel value for each pixel within the identified one or more planes by a weighted average of pixel values from nearby pixels within the one or more identified planes.

De-noising filters act under an assumption that nearby pixels are often likely to have similar pixel values. As used herein, the term "pixel value" refers to intensity or color information. As used herein, the term "nearby pixels" refers to more than one pixel occupying a spatial locality. Accordingly, two pixels can be "close" to one another, that is, occupy a nearby spatial location, or they can be "similar" to one another, that is, have nearby pixel values, possibly in a perceptually meaningful fashion. The term "closeness" refers to vicinity in the domain of the image frame and the term "similarity" refers to vicinity in the range of the image frame. Accordingly, the de-noising filter may combine range and domain filtering to compute a weighted average of pixel values for nearby pixels, wherein identified planes within the identified region of interest are smoothed and identified edges are preserved. Simply put, the de-noising filter averages away small, weakly correlated differences between pixel values of nearby pixel vales caused by noise. The de-noising filter is adaptable to be applied to both grayscale image frames and color image frames. In a non-limiting embodiment, when the image frame includes a color image frame, application of the de-noising filter only averages perceptually similar colors together to result in preservation of only perceptually important edges.

Another example of spatially-implemented super-resolution includes application of a sharpening filter executed by the processor 22 of FIG. 1. As used herein, the term "sharpening filter" refers to a filter utilized to enhance sharpness in the identified region of interest of the image frame, and thus, reduces image blurring. In one embodiment, the sharpening filter is applied to the identified region of interest subsequent to application of the de-noising filter. In a non-limiting exemplary embodiment, the sharpening filter includes an unsharp masking (USM) filter.

Figure 3:
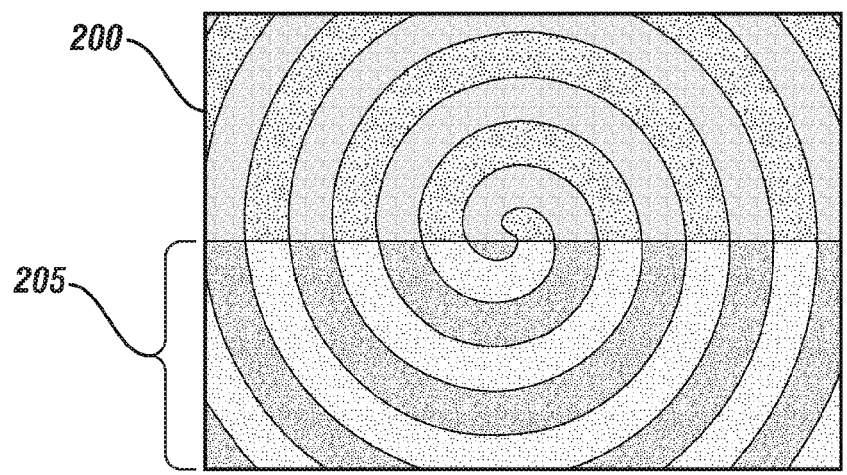
FIG. 3 illustrates an exemplary unsharp masking filter for sharpness enhancement of an image, in accordance with the present disclosure.

FIG. 3 illustrates an exemplary USM filter for sharpness enhancement of a captured raw image 200, in accordance with the present disclosure. Application of the USM filter can be location-dependent, wherein a bottom portion 205 of the image 200 includes the USM filter applied thereto.

Exemplary embodiments are directed toward the sharpening filter being a location-dependent sharpening filter to achieve a desired increased sharpening in the identified region of interest. The sharpening filter, such the USM filter of FIG. 3, employs a plurality of filter settings to control sharpening including a magnitude of overshoot, radius and an intensity threshold. The plurality of filter settings can be adjusted to achieve the desired increased sharpening. For instance, the magnitude of overshoot of each identified edge within the region of interest can be adjusted. The magnitude of overshoot can be indicative of image contrast and can be expressed as a percentage. The radius of each identified edge within the region of interest can be adjusted. The radius affects the size of the identified edges to be enhanced, wherein a smaller radius enhances a smaller-scale detail while a larger radius may result in hallows at the edges, e.g., a detectable faint line rim around objects. Specifically, adjusting the radius allows one to set how many pixels on either side of an identified edge will be affected by sharpening. It will be appreciated that the magnitude of overshoot is indirectly proportional to the radius. For instance, reducing one of the magnitude of overshoot and the radius enables the other one of the magnitude of overshoot and the radius to be increased. The intensity threshold controls a minimum intensity change of pixels, e.g., brightness, associated with identified edges that will be sharpened. The minimum intensity change of pixels can be determined based on subtracting a blurred copy of the image frame from the image frame, as described below in the non-limiting embodiment of the sharpening filter of FIG. 4. Accordingly, adjustments to the intensity threshold can be employed by the processor 22 to prevent smooth areas/regions from becoming speckled while more pronounced edges can be sharpened. Moreover, increasing the intensity threshold is operative to exclude areas/regions of lower contrast. In an exemplary embodiment, decreasing the radius and decreasing the intensity threshold increases the sharpening of the region of interest, wherein each of the radius and the intensity threshold include adjusted values to achieve the desired increased sharpening. Additionally, the location-dependent sharpening filter may be operative to achieve a desired decreased sharpening in regions outside of the region of interest for enhancing smoothing of the edges, wherein the desired decreased sharpening may use an increased radius and an increased intensity threshold of the processing filter settings.

FIG. 4 illustrates an exemplary sharpening filter 300 to enhance sharpness of an identified region of interest within an image frame, in accordance with the present disclosure. The sharpening filter 300 may include a USM filter that is executed by the processor 22 of FIG. 1. The sharpening filter receives an input image frame 302. In the illustrated embodiment, a de-noising filter has already been applied to the input image frame 302 to reduce noise, wherein the input image frame 302 represents a FOV rearward of a subject vehicle, e.g., vehicle 10 of FIG. 1. The input image frame 302 may be perceived as being both sharp and smooth. A copy of the input image frame 302 is blurred through Gaussian filtering to obtain a blurred image 304. The blurred image 304 may be perceived as being smooth. Specifically, the aforementioned radius among the plurality of filter settings is adjusted to obtain the blurred image 304. While the blurred image 304 refers to an entire image frame, it will be appreciated that the sharpening filter can be location-dependent, wherein the radius can be adjusted to achieve a desired sharpness or smoothing within an identified region of interest, e.g., an enlarged center region.

For illustrative purposes only, a difference unit 305 compares the blurred image 304 and the input image frame 302 to generate a difference image 306. The difference image 306 can include an intensity change or difference of pixels associated with identified edges between the input image frame 302 and the blurred image 304. The aforementioned intensity threshold can be adjusted to control a minimum intensity change or difference of pixels associated with identified edges that will be sharpened. Thus, pixels associated with edges having intensity changes in the difference image 306 that exceed the intensity threshold will be kept, while pixels having intensity changes less than the intensity threshold will be removed. The difference image 306 including the pixels that exceed the intensity threshold is added by adder 307 to generate a resulting image 309. The resulting image 309 is perceived as being sharpened by the sharpening filter. In one embodiment, the resulting image 309 can be displayed upon the rearview mirror display device 24 of FIG. 1. In another embodiment, the resulting image 309 in combination with one or more other resulting images of the same scene and having sharpening filters applied thereto, can be subjected to temporally-implemented super-resolution to the resulting images dependent upon a location within each of the resulting images.

It will be appreciated that the exemplary sharpening filter described with reference to FIG. 4 is for illustrative purposes only. For instance, the difference unit 305 and the adding unit 307 are not actually present but merely shown to illustrate the differencing and adding carried out by the sharpening filter. Moreover, the exemplary sharpening filter is not executed in a series of sequential steps or parts as depicted in the illustrative embodiment of FIG. 4, but rather, each of the illustrative images 302, 304 and 309 are executed simultaneously to achieve a desired increased sharpening by the exemplary sharpening filter 300.

Figure 5:
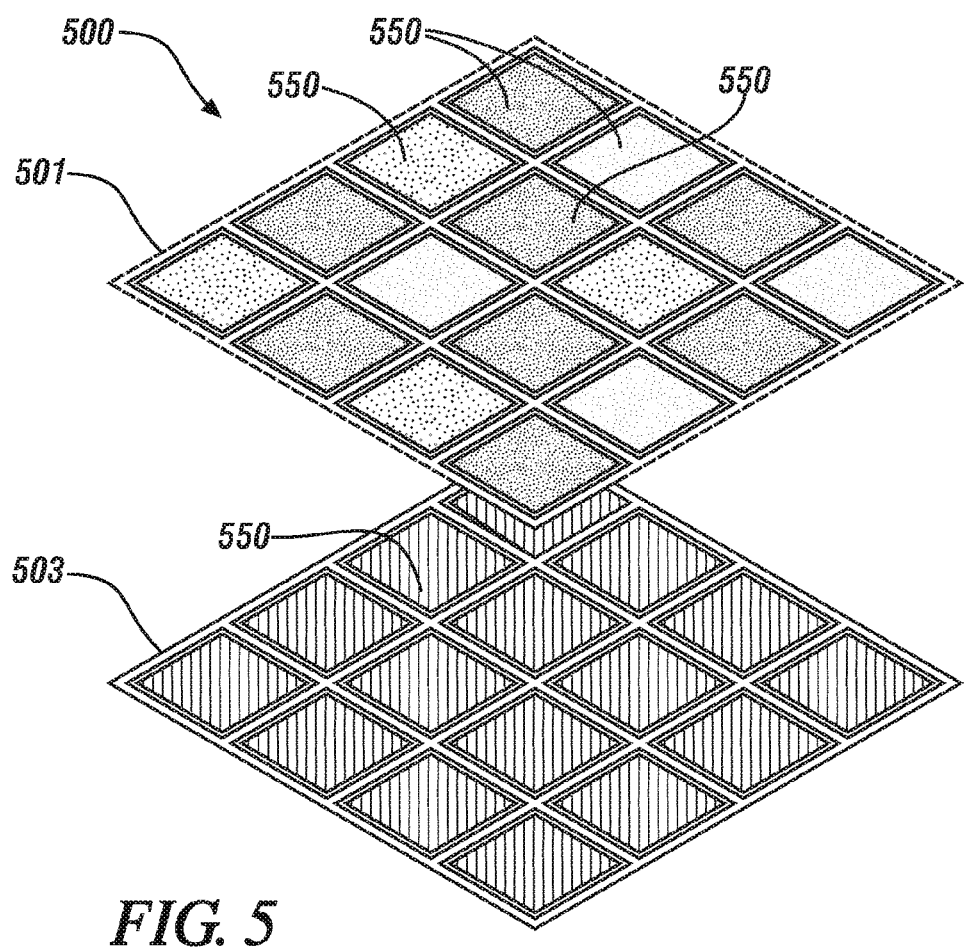
FIG. 5 illustrates an exemplary embodiment of an imaging chip, in accordance with the present disclosure.

Referring to FIG. 5, an exemplary embodiment of an imaging chip 500 including an array of pixels 550 is illustrated, in accordance with the present disclosure. The imaging chip 500 includes a filter portion 501 and a circuit portion 503. While not separately distinct, the filtering portion 501 and the circuit portion 503 are separated for purposes of illustration only to describe the exemplary embodiments described herein. In the illustrated embodiment pixels 550 include green (Gr and Gb), blue (B) and red (R) pixels, each having a respective response to light due to different color filters. While the filter portion 501 in the illustrated embodiment includes a color filter, it will be appreciated that embodiments herein are not limited to the filter portion 501 including a monochromic filter portion. Referring to the circuit portion 503, each pixel 550 is capable of being adjusted between one of a short-exposure time and a long-exposure time at a time. Utilizing the imaging chip 500, the processor 22 can temporally obtain short- and long-exposures for given time periods. For instance, each pixel 550 may include a short-exposure time during a first time period to obtain a short-exposure image and then each pixel 550 may be adjusted to include a long exposure time during a second time period to obtain a long-exposure image.

Figure 6:
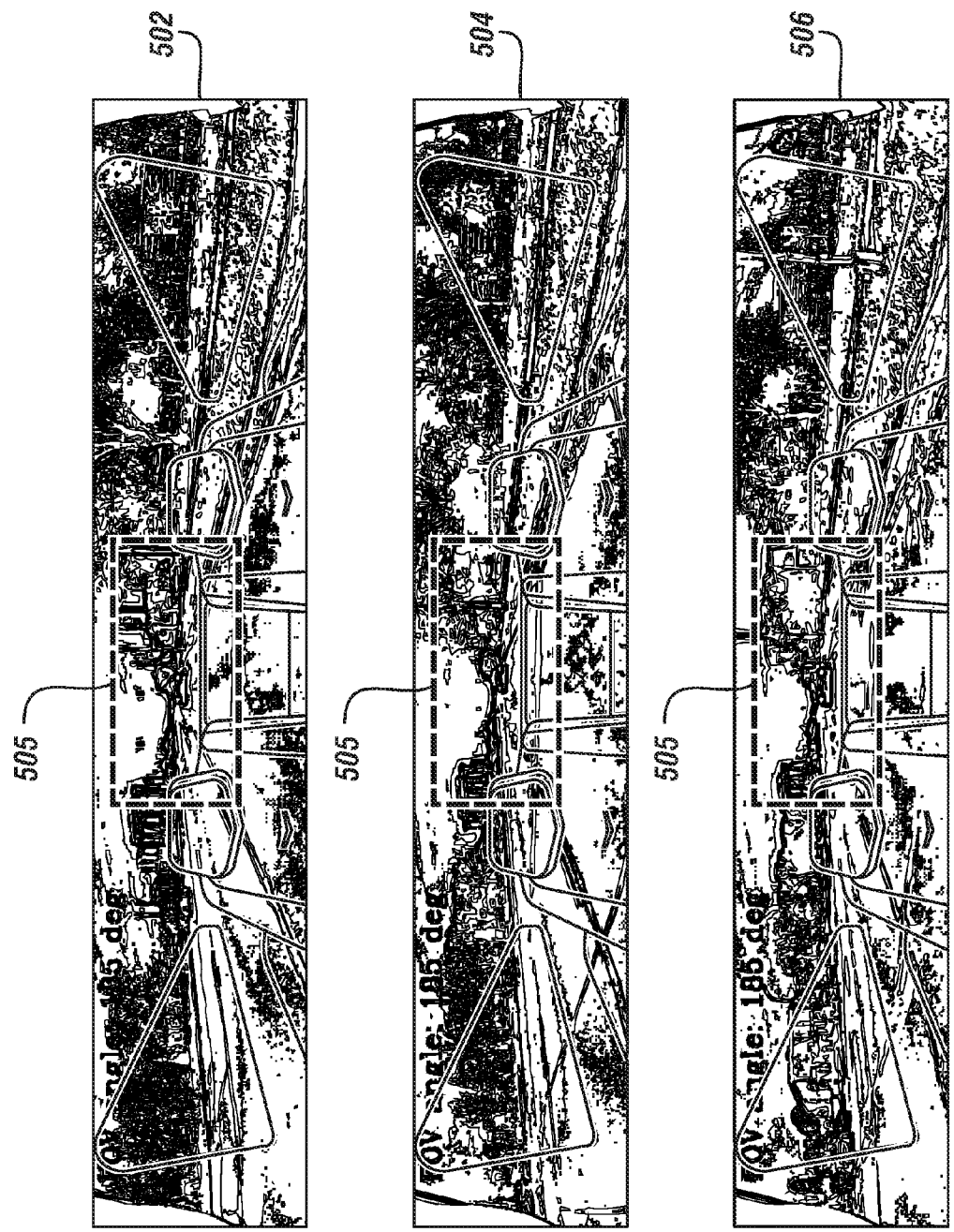
FIG. 6 illustrates a plurality of image frames captured by a rear-view device of FIG. 1 representing a field of view rearward of the vehicle, in accordance with the present disclosure.

FIG. 6 illustrates a plurality of image frames 502, 504 and 506 captured by the rear-view camera device 16 of FIG. 1 representing a FOV rearward of the vehicle, in accordance with the present disclosure. While three image frames are depicted any number of image frames can be selected. Each of the image frames 502, 504, 506 includes a region of interest 505 encompassing a target vehicle travelling behind the subject vehicle, e.g., vehicle 10 of FIG. 1. In the illustrated embodiment, the second image frame 504 is captured later in time than the first image frame 502, and the third image frame 506 is captured later in time than the second image frame 504. Referring to the first and second image frames 502, 504, respectively, the target vehicle within the region of interest 505 is closer in the second image frame than that of the first image frame. Thus, the target vehicle is moving. Referring to the second and third image frames 504, 506, respectively, the target vehicle within the region of interest 505 is closer in the third image frame 506 than that of the second image frame 504. Thus, the position of the target vehicle within the region of interest 505 has moved in each of the first, second and third image frames 502-506 due to the target vehicle moving faster than the subject vehicle in the illustrated embodiment. Other embodiments can include the target vehicle moving slower than the subject vehicle or the target vehicle laterally moving to the left or to the right with respect to the orientation of the subject vehicle.

Exemplary embodiments of the present disclosure may apply temporally-implemented super-resolution to a plurality of image frames dependent upon a location within each of the image frames, and thereafter, generate a resultant image based on temporally-implemented super-resolution to the plurality of image frames. In one embodiment, each of the image frames correspond to image frames having spatially-implemented super-resolution applied thereto, e.g., a de-noising filter or a sharpening filter, as described above in the non-limiting exemplary embodiment of FIG. 4. In another embodiment, each of the image frames correspond to image frames subsequent to being stretched to enlarge a center region within each of the image frames. In even yet another embodiment, each of the input image frames correspond to respective ones of raw image frames captured by a camera device prior to applying digital or image processing to enlarge a center region within each of the image frames through stretching the raw images. Accordingly, embodiments herein are not directed toward any order in which spatially-implemented super-resolution and temporally-implemented super-resolution are applied. For instance, the input image frame 302 illustrated in the sharpening filter 300 of FIG. 4 may correspond to the resultant image generated based on the temporally-implemented super-resolution applied to a plurality of raw captured image frames.

In general, temporally-implemented super-resolution reconstructs a high-resolution resultant image from a set of low-resolution images. A dynamic scene, such as that illustrated with respect to images 502-506 of FIG. 6, often results in displayed images being warped because of relative motion between the scene and a camera device (e.g., rear-view camera device 16 of FIG. 1). For instance, the image frames are blurred by both atmospheric turbulence and the camera device by point spread function. Additionally, the image frames may be discretized at the imaging chip resulting in digitized noisy image frames. In a non-limiting example, pure translational motion can be treated with temporally-implemented super-resolution, wherein even small deviations from translational motion significantly degrade performance. However, motions more complex than pure translational motion can be treated with temporally-implemented super resolution using different image registration routines. While the spatially-implemented super-resolution is concerned with edge preservation and sharpening edges in each image frame on an individual basis, temporally-implemented super-resolution seeks robustness with respect to motion error, blur, outliers, and other kinds of errors not explicitly modeled in fused images. The temporally-implemented super-resolution can include three stages: motion detection, interpolation, and restoration. These steps can be implemented separately or simultaneously.

Motion detection includes estimating motion information between the plurality of image frames compared to a reference image frame with fractional pixel accuracy. Hence, sub-pixel motion must be estimated between the image frames. Since shifts between the plurality of image frames will not always match up to a uniformly spaced grid, non-uniform interpolation is necessary to obtain a uniformly spaced resulting image (e.g., high-definition image) from a non-uniformly spaced composite of the plurality of image frames (e.g., plurality of low resolution image frames). Finally, image restoration is applied to the up-sampled resultant image having enhanced resolution to remove blurring and noise. Image restoration can include a multi-frame average of pixel values for de-noising, scaling and offsets to eliminate differences found in one or more of the plurality of images.

Various approaches known in the art of temporally-implemented super-resolution are envisioned including, but not limited to, a non-uniform interpolation approach that conveys an intuitive comprehension of super-resolution image reconstruction and a frequency domain approach that is helpful to see how to exploit an aliasing relationship between the plurality of low-resolution images. Deterministic and stochastic regularization approaches are also envisioned as methods known in the art of temporally-implemented super-resolution.

Figure 7:
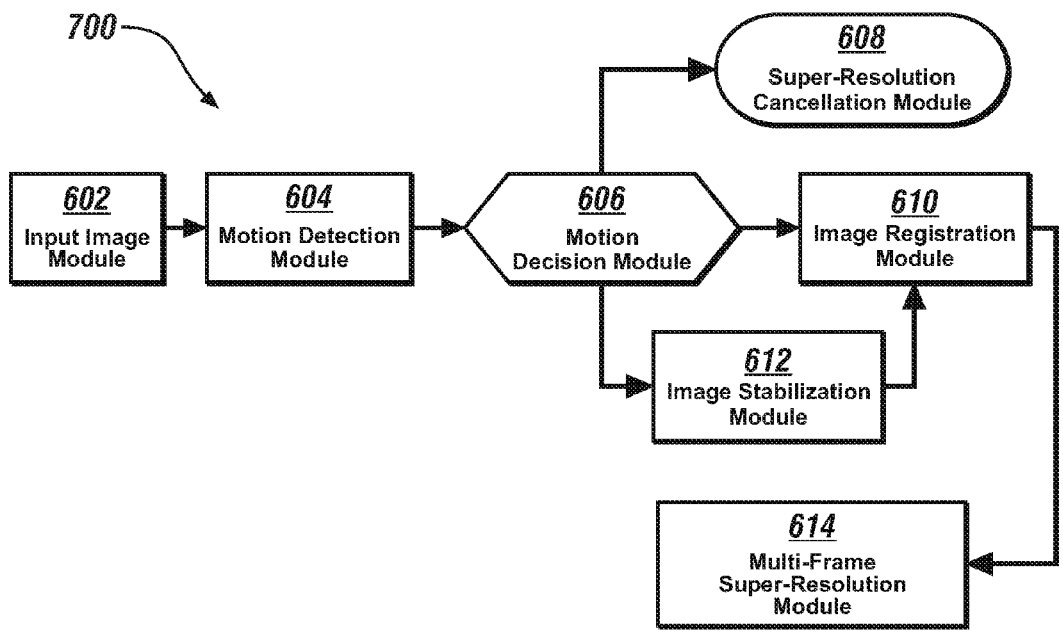
FIG. 7 illustrates an exemplary controller executed by the processor of FIG. 1 for applying temporally-implemented super-resolution to a plurality of image frames, in accordance with the present disclosure.

FIG. 7 illustrates an exemplary controller 700 executed by the processor 22 of FIG. 1 for applying temporally-implemented super-resolution to a plurality of image frames, in accordance with the present disclosure. The controller 700 includes an input image module 602, a motion detection module 604, a motion decision module 606, a super-resolution cancellation module 608, an image registration module 610, an image stabilization module 612 and a multi-frame super-resolution module 614.

The input image module 602 inputs a plurality of image frames to the motion detection module 604. The plurality of image frames can be selected over a time period. In one embodiment, the plurality of image frames from the input image module 602 each have spatially-implemented super-resolution applied thereto. In another embodiment, the plurality of image frames correspond to raw images captured by a camera device as described above in the non-limiting example of the raw image 100 illustrated in FIG. 2-1. In even yet another embodiment, the plurality of image frames correspond to display images including an enlarged center region as described above in the in non-limiting example of the display image 102 illustrated in FIG. 2-2.

The motion detection module 604 detects a degree of object motion among the plurality of input image frames. The motion detection module 604 may first identify stationary regions and moving regions. As aforementioned, the temporally-implemented super-resolution can be location dependent and applied to an identified region, e.g., an enlarged center region, of the plurality of images to increase computational efficiency of the processor 22. Detecting the degree of object motion can include, but is not limited to, monitoring optical flow, tracking feature points and template matching among the plurality of input image frames. The degree of object motion among the plurality of input image frames is then input to the motion decision module 606. If the motion decision module 606 determines the degree of object motion detected by the motion detection module 604 includes a large magnitude of motion, e.g., the degree of object motion is at least a motion threshold, the controller 700 cancels any application of super-resolution at the super-resolution cancellation module 608. If the motion decision module 606 determines the degree of objection motion includes pitch, image stabilization is performed at the image stabilization module 612. As used herein, the term "pitch" refers to a variance of relative motion between the scene and a camera device (e.g., rearview camera device 16 of FIG. 1). For instance, the subject vehicle traveling on a rough surface could result in a variance of relative motion between the scene and the camera device of the subject vehicle capturing the image frames. Accordingly, the image stabilization module 612 stabilizes each of the plurality of input image frames, e.g., stabilizes the area encompassed by the identified region of interest to remove a "bouncing effect" caused by the detected pitch. In one embodiment, image stabilization can include applying scale-invariant feature transform (SIFT) to detect and describe local features, e.g., objects, among the plurality of input image frames. For instance, object segments may be stabilized and registered at the sub-pixel level. After image stabilization is performed at the image stabilization module 612, image registration is performed at the image registration module 610. If the motion decision module 606 determines the degree of object motion includes no motion or a small magnitude of motion, e.g., the degree of object motion is less than the motion threshold, image registration is performed for the plurality of input images at the image registration module 610. In one embodiment image registration includes template matching to recognize at least one of objects and features within the input image frames. Examples of objects can include vehicles travelling on a roadway, pedestrians, wildlife and infrastructures. Based on the template matching, differences can be identified between each of the image frames. For instance, feature points consistent in each of the images can be registered at the sub-pixel level, whereas the identified differences can be removed utilizing methods such as scaling and offset. With the differences removed from the plurality of input image frames and the feature points remaining, multi-frame super-resolution can be applied among the plurality of input images at the multi-frame super-resolution module 614 to generate a resulting image frame having enhanced resolution.

Applying super-resolution among the plurality of input image frames may include application of a bi-lateral filter to reduce noise. For instance, the reduction of noise can be accomplished by replacing a pixel value for each pixel in each image frame by a weighted average of pixel values for each pixel within a spatial location among the plurality of input image frames. Additionally or alternatively, super-resolution to each input image among the plurality of input image frames may include application of a sharpening filter to enhance sharpness and reduce blurring in each of the plurality of input images. Super-resolution may further be carried out by applying interpolation among the plurality of input images, wherein one or more input images may be used to infer the application of super-resolution to other input images.

Figure 8:
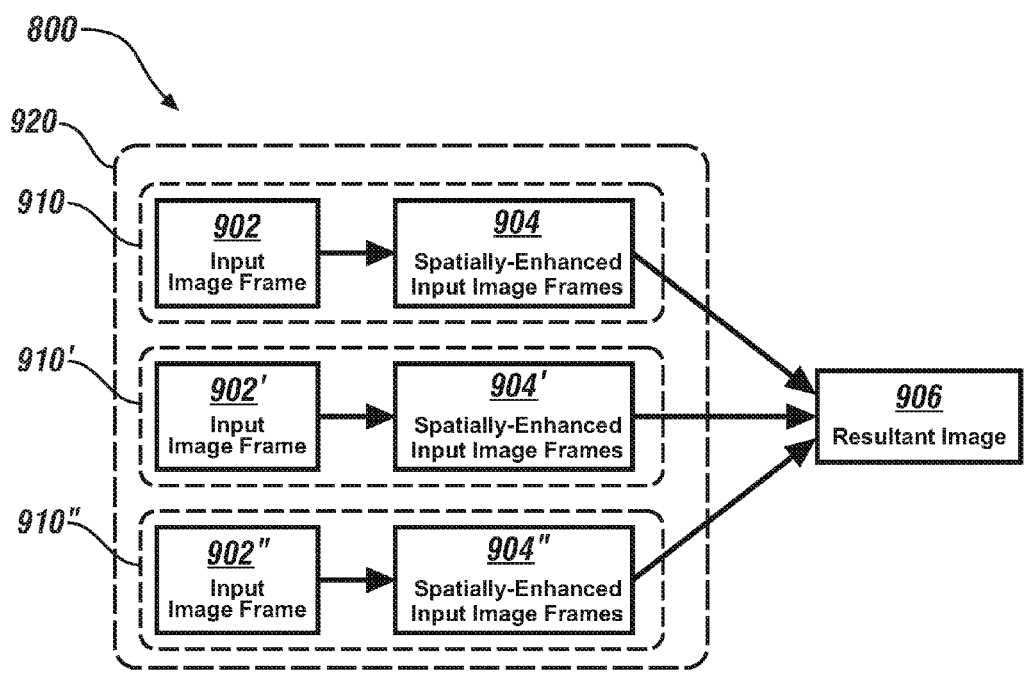
FIG. 8 illustrates an exemplary flowchart illustrating a non-limiting embodiment of spatially-implemented super-resolution and temporally-implemented super-resolution applied in combination to a plurality of image frames captured by a camera device, in accordance with the present disclosure.

FIG. 8 illustrates an exemplary flowchart 800 illustrating a non-limiting embodiment of spatially-implemented super-resolution and temporally-implemented super-resolution applied in combination to a plurality of image frames captured by a camera device, in accordance with the present disclosure. The exemplary flowchart 800 can be executed by, and implemented within, the non-transitory processing device 22 illustrated in FIG. 1. Input frames 902, 902', 902" are indicative of a same road scene rearward of the subject vehicle 10 over a time period and may include raw image frames having a diminished center region or display image frames having an enlarged center region subsequent to applying software to stretch raw images. In the illustrated embodiment, three input image frames 902, 902', 902" are illustrated; however, it is appreciated that any plurality of input image frames can be included in the illustrated embodiment. Spatially-implemented super-resolution is applied to each input image frame on an individual basis as depicted by dashed boxes 910, 910', 910". For each input image frame 902, 902', 902", the region of interest can be identified requiring resolution related to detail per pixel to be increased and spatially-implemented super-resolution can be applied to the region of interest in each input image frame 902, 902', 902" to enhance image sharpness within each region of interest. Spatially-enhanced input image frames 904, 904', 904" are generated subsequent to applying the spatially-implemented super-resolution to each of the input image frames 902, 902', 902".

Temporally-implemented super-resolution is applied among spatially-enhanced input image frame 904, 904', 904" as depicted by dashed box 920. The temporally-implemented super-resolution can be applied to only feature points among the spatially-enhanced input image frames 904, 904', 904" as determined through image registration utilizing methods such as template matching to recognize features or objects. Accordingly, applying temporally-implemented super-resolution among the spatially-enhanced input image frame 904, 904', 904" generates a resultant image 906 having enhanced resolution. It will be appreciated that the temporally-implemented super-resolution is only applied if a degree of object motion includes one of pitch, no motion, and a small magnitude of motion less than a motion threshold, as described above with reference to the exemplary controller 700 of FIG. 7.

It will be appreciated that application of super-resolution, whether spatially-implemented or temporally-implemented, can be location-dependent to regions of interest in each input image frame. For instance, reduced center regions in raw captured images that are enlarged using imaging or digital processing often include diminished or reduced resolution in the now enlarged center region. In embodiments applying a sharpening filter, a desired increased sharpening may be location-dependent upon the center region of each input image by using a decreased radius and a decreased intensity threshold of the processing filter settings of the sharpening filter.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for applying super-resolution to images captured by a camera device of a vehicle, comprising:
    obtaining a plurality of image frames captured by the camera device;
    for each image frame:
        identifying a region of interest within the image frame requiring resolution related to detail per pixel to be increased; and
        applying spatially-implemented super-resolution to the region of interest within the image frame to enhance image sharpness within the region of interest, including:
            applying a sharpening filter to the region of interest within each image frame to enhance the resolution with the region of interest to achieve a desired increased sharpening within the region of interest, said desired increased sharpening achieved based on adjusting filter settings of the sharpening filter associated with the region of interest.

2. The method of claim 1, wherein the identified region of interest corresponds to an enlarged center region of a display image frame subsequent to stretching a raw image captured by the camera device having optical aberrations, the enlarged center region having a diminished resolution related to detail per pixel.

3. The method of claim 1, wherein the identified region of interest comprises the entire image frame.

4. The method of claim 1, wherein the applied spatially-implemented super-resolution to the region of interest within the image frame further comprises:
    applying a de-noising filter to reduce noise through smoothing one or more identified planes within the region of interest while preserving one or more identified edges within the identified region of interest.

5. The method of claim 4, wherein applying the de-noising filter comprises:
    monitoring image gradient within the identified region of interest;
    identifying the one or more edges where the monitored image gradient is at least a gradient edge threshold;
    identifying the one or more planes where the monitored image gradient is less than the gradient edge threshold; and
    replacing a pixel value for each pixel within the identified one or more planes by a weighted average of pixel values from nearby pixels within the one or more identified planes.

6. The method of claim 1 wherein applying the location-dependent sharpening filter further achieves a desired decreased sharpening in regions outside of the region of interest, said desired decreased sharpening achieved based on adjusting filter settings of the sharpening filter associated with respective regions outside the region of interest.

7. The method of claim 1, wherein the adjusted filter settings of the sharpening filter comprises:
    an adjusted radius of the identified edges within the region of interest, the adjusted radius indirectly proportional to the adjusted magnitude of overshoot; and
    an adjusted intensity threshold for controlling a minimum intensity change of pixels associated with the identified edges that will be sharpened.

8. The method of claim 1, further comprising:
    for the plurality of image frames having the spatially-implemented super-resolution applied thereto:
        applying temporally-implemented super-resolution to the image frames dependent upon a location within each of the image frames, said location comprising the identified region of interest; and
        generating a resultant image based on the temporally-implemented super-resolution applied to the image frames.

9. The method of claim 8, further comprising:
    detecting a degree of object motion among the plurality of image frames having the spatially-implemented super-resolution applied thereto; and
    only applying the temporally-implemented super-resolution to the image frames if the degree of object motion includes one of pitch, no motion, and a magnitude of motion less than a motion threshold.

10. The method of claim 8, wherein applying the temporally-implemented super-resolution to the image frames comprises:
    for each of the image frames:
        identifying stationary regions and moving regions;
        applying image registration for recognizing at least one of features and objects within each of the stationary and moving regions;
        identifying differences between each of the image frames based on the applied image registration;
        removing the identified differences from respective ones of the image frames; and
        subsequent to removing the identified differences, applying the temporally-implemented super-resolution among the input image frames to generate the resulting image frame having enhanced resolution.

11. Method for applying super-resolution to one or more images captured by a camera device of a subject vehicle, comprising:
    for multiple image frames over a period of time of a scene representing a field of view rearward of the subject vehicle:
        identifying an enlarged center region having diminished resolution related to detail per pixel within the multiple image frames;
        detecting a degree of object motion among the multiple image frames;
        if the degree of object motion includes one of pitch, no motion, and a small magnitude of motion less than a motion threshold, applying image registration for recognizing at least one of objects and features within the input image frames;

applying temporally-implemented super-resolution to enhance the resolution within the enlarged center region of the multiple image frames; and generating a resulting image based on the multiple image frames with the temporally-implemented super-resolution applied thereto;

for a single image frame of the scene representing the field of view rearward of the subject vehicle:

identifying the enlarged center region within the single image frame;

applying location-dependent spatially-implemented super-resolution to enhance resolution within the identified enlarged center region, said spatially-implemented super-resolution including applying a sharpening filter to the enlarged center region within the single image frame to enhance the resolution with the region of interest to achieve a desired increased sharpening within the enlarged center region, said desired increased sharpening achieved based on adjusting filter settings of the sharpening filter associated with the region of interest.

12. The method of claim 11, wherein each of the multiple image frames corresponds to one of:

respective ones of single image frames having location-dependent spatially-implemented super-resolution applied thereto prior to detecting the degree of object motion; and respective ones of raw image frames captured by the camera device.

13. The method of claim 11, wherein the single image having the location-dependent spatially-implemented super-resolution applied to the identified enlarged center region corresponds one of:

the generated resulting image based on the multiple image frames; and a raw image frame captured by the camera device.

14. The method of claim 11, wherein the identified enlarged center region corresponds to an enlarged center region of a display image generated by stretching a raw image captured by the camera device, the enlarged center region having a diminished resolution related to detail per pixel.

15. The method of claim 11, wherein the sharpening filter comprises an unsharp masking filter.

16. The method of claim 11, further comprising:

applying image stabilization prior to applying image registration if the degree of object motion detects pitch.

17. Apparatus for applying super-resolution to one or more images captured by a vision-based imaging system of a subject vehicle, comprising:

a rear-view camera device configured to capture a plurality of image frames of a scene representing a field of view rearward of the subject vehicle; and a processing device configured to:

receive the plurality of image frames captured by the rear-view camera device, identify, within each image frame, an enlarged center region having diminished resolution related to detail per pixel, apply at least one of a de-noising filter and a sharpening filter to the enlarged center region within each image frame to enhance the resolution within the enlarged center region, for the plurality of image frames having the at least one of the de-noising filter and the sharpening filter applied thereto:

apply temporally-implemented super-resolution to the image frames dependent upon a location within each of the image frames, said location comprising the identified region of interest, generate a resultant image based on the temporally-implemented super-resolution applied to the image frames, and a rearview mirror display device configured to display images captured by the rear-view camera device.

* * * * *